April 14, 1953  J. M. STOREY  2,634,995
HIGH-PRESSURE PACKING RING AND CORE ELEMENT THEREFOR
Filed May 31, 1950  2 SHEETS—SHEET 2
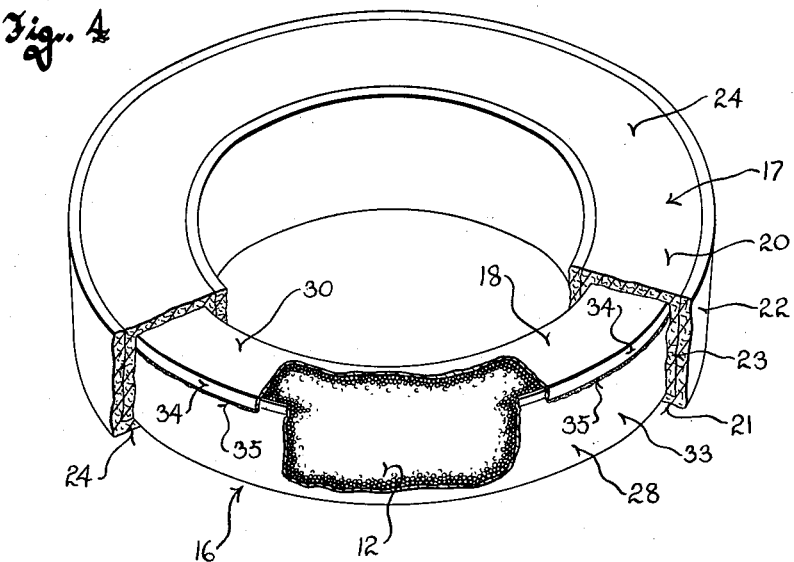
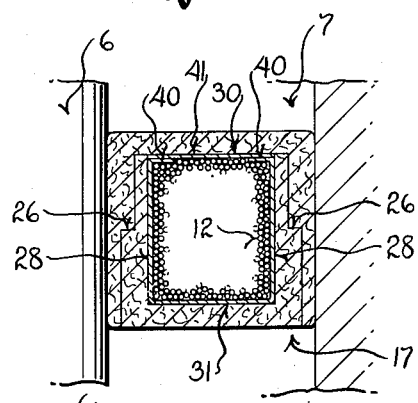
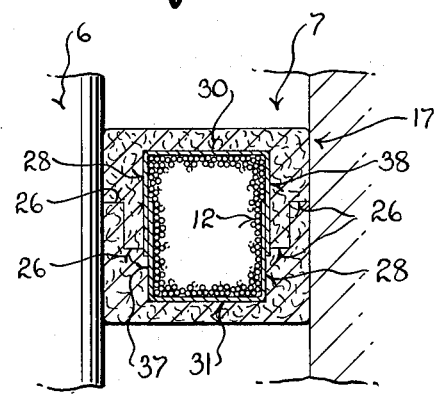
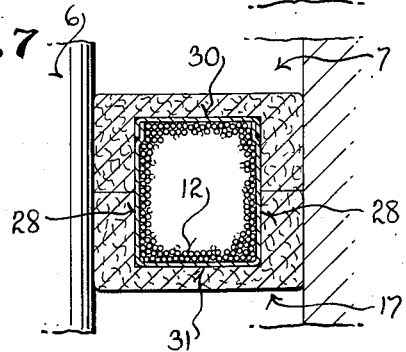
James M. Storey Patented Apr. 14, 1953

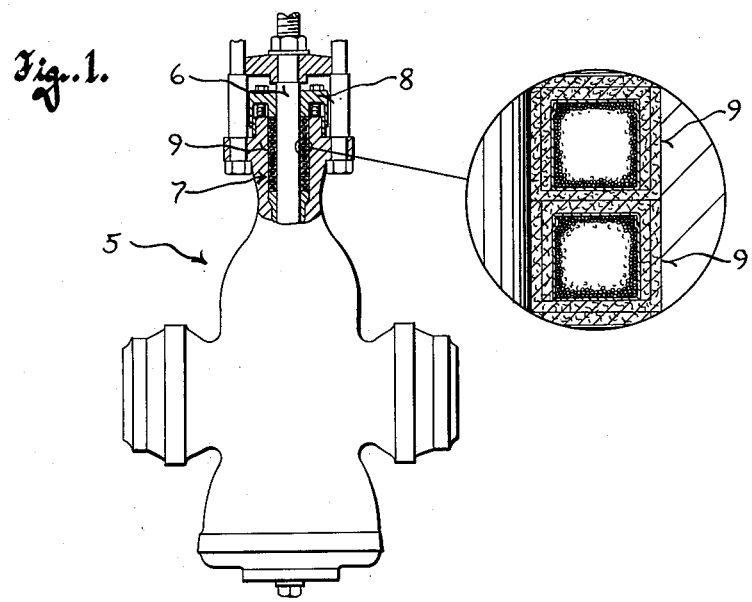
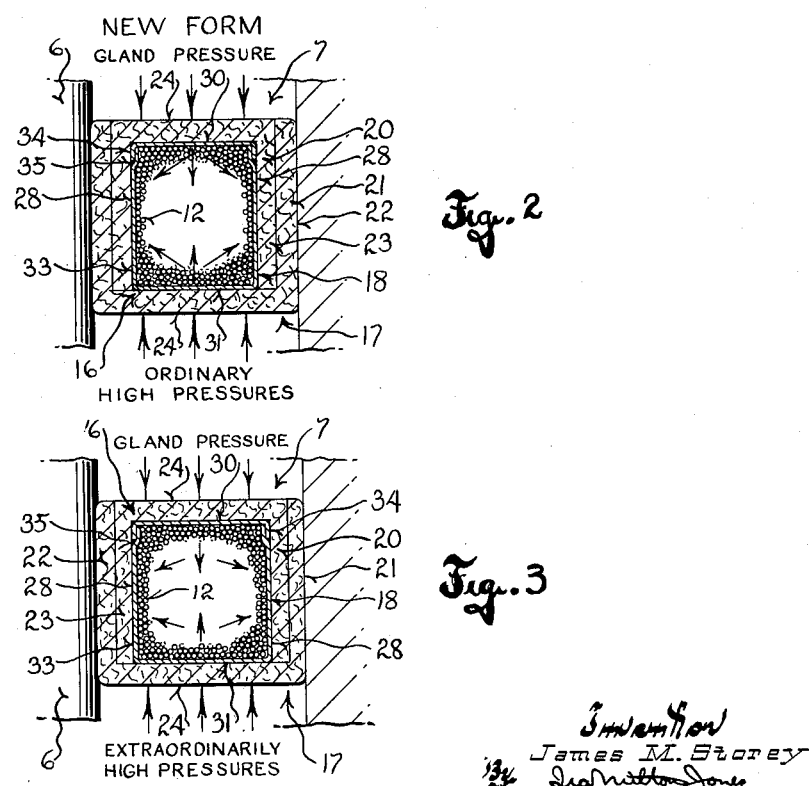

2,634,995

UNITED STATES PATENT OFFICE 2,634,995

HIGH-PRESSURE PACKING RING AND CORE ELEMENT THEREFOR

James M. Storey, Maidenhead, England, assignor to Dewrance & Co. Ltd., London, England, a corporation of England Application May 31, 1950, Serial No. 165,142

1 Claim. (Cl. 288—8)

This invention relates generally to valves for high pressure, high temperature service, as in power plants and the like, and has more particular reference to packing rings used in the stuffing boxes and as cover seals for such valves.

High pressure, high temperature packings rings of this type are shown and described in Patent No. 1,526,628, issued to B. E. Church, February 17, 1925. They comprise two superimposed ring-shaped parts of asbestos fibre and India rubber vulcanized to a hard state and having channels in their meeting faces to provide an annular cavity in which a yieldable material or mass is contained; the yieldable material or mass being tiny balls of metal such as nickel, and sometimes referred to as dust shot.

In the past it has been customary to line the cylindrical side walls of the shot cavity with a suitable sheet metal, usually copper because of its ready deformability under pressure. These concentric liners for the cylindrical side walls of the shot cavity in the packing ring served to distribute to some extent the radial side thrust exerted by the shot in consequence to subjection of the ring to axial compression in use.

Inasmuch as these packing rings are used in valves designed for the highest pressures and temperatures encountered in handling superheated steam, frequently 2,000 lbs. per square inch or over, the axial compressive force tending to squeeze the parts of the packing ring together often resulted in short life of the asbestos cover of the ring due to the tendency of the shot to cut through its unprotected end walls.

Another objection to this type of packing ring is that quite complicated and tedious procedure had to be employed in loading its shot chamber or cavity with shot. The methods commonly employed at present thus seriously limit production.

With these objections to past high pressure, high temperature packing rings in mind, this invention has as one of its purposes to provide a unitary core element for the shot cavity of packing rings of the character described, the use of which greatly facilitates manufacture of the rings.

More specifically it is an object of this invention to provide a unitary core element for the shot cavity of a packing ring, which element comprises a hollow metal container to hold and completely enclose the shot for the ring, and which can be handled extensively prior to installation in the packing ring without loss of shot.

Still another object of this invention resides in the provision of a packing ring of the character described wherein the shot is contained within an inner metallic casing or container and wholly isolated from the surrounding asbestos walls of the packing ring so as to prevent the shot from contacting them and being forced therethrough by pressure.

With the above and other objects in view which will appear as the description proceeds, this invention resides in the novel construction, combination and arrangement of parts substantially as hereinafter described, and more particularly defined by the appended claim, it being understood that such changes in the precise embodiments of the hereindisclosed invention may be made as come within the scope of the claim.

The accompanying drawings illustrate several complete examples of the physical embodiment of the invention constructed in accordance with the best modes so far devised for the practical application of the principles thereof, and in which:

Figure 1 is a side elevational view of a high pressure valve having wall portions thereof at the stuffing box broken away to illustrate the application of the packing rings of this invention thereto, and including a magnified section of two adjacent packing rings;

Figures 2 and 3 are similar enlarged sectional views through one of the packing rings of this invention showing the same in different states of compression in the stuffing box of the valve;

Figure 4 is a perspective view of a packing ring embodying the principles of this invention, with portions of both the outer and inner casings broken away and in section; and Figures 5, 6, and 7 are cross sectional views similar to Figure 2 but illustrating modified embodiments of the invention.

Referring now more particularly to the accompanying drawings in which like numerals indicate like parts, the numeral 5 generally designates a valve of the type used for high pressure, high temperature service, such as in superheated steam lines of power systems and the like. The valve illustrated is known as a slide valve and has a vertically movable valve stem 6 which at the upper portion of the valve passes through a stuffing box generally designated 7.

As is customary the valve is provided with a packing gland 8 which may be forced downwardly about the exterior of the valve stem and into the stuffing box to bear against the topmost of a stack of packing rings 9 therein. These rings are held under axial compression in the stuffing box by the gland and by the pressure of fluid in the valve, with the result that the rings are expanded radially into good sealing engagement with the wall of the stuffing box and the exterior of the valve stem to prevent leakage of steam around the latter.

In the past it was customary to make the packing rings in the manner illustrated in the hereinbefore mentioned Patent No. 1,526,628. The ring therein illustrated comprises a pair of superimposed rings of an asbestos-rubber composition having complementary channels in their meeting faces to provide an annular shot cavity inside the ring. This cavity is filled with nickel dust shot or the like; and the usual practice was to line the cylindrical side walls of the cavity with readily deformable sheet metal tubes or strips, leaving the top and bottom walls of the shot cavity unprotected.

When subjected to ordinary high pressures, the aforementioned packing ring is compressed axially and the shot is caused to exert a radial side thrust on the liners tending to expand the ring in the stuffing box. This, of course, is desirable since it assures sealing engagement of the ring with the walls of the stuffing box and the exterior of the valve stem.

However, under the extraordinarily high steam pressures now more frequently used in power plants and the like, the great compressive forces on the ring often force the shot 12 through the end walls of the ring. In the light of this tendency for the shot to cut through the top and bottom or end walls of the packing ring in consequence to the compressive force on the ring it will be readily appreciated that when the shot is forced entirely through these walls, the packing ring is destroyed.

In addition, this tendency for the shot to work through the end walls of the ring also seriously limited translation, by the shot, of compressive forces into inwardly and outwardly directed radial forces essential to good sealing of the valve in the stuffing box.

In the aforementioned conventional packing ring, the sheet metal strips or liners comprise, in effect, the side walls of the shot cavity, while the end walls of the outer asbestos cover comprise the top and bottom walls of the cavity. Because of this fact it has always been a difficult and time consuming job to load the shot into the shot cavity. Frequently much of the shot was lost when any but the most skilled workers performed the filling operation.

According to this invention, the afore-mentioned undesirable aspects of past high pressure packing rings are overcome through the provision of a unitary core element generally designated 16 to fit the shot cavity of the rings. The core element 16 not only features a container for the shot entirely independent of the outer asbestos casing of the packing ring, but also covers and protects all of the walls of the shot cavity of a packing ring in which it is used.

A packing ring constructed in accordance with this invention is best illustrated in Figures 2, 3, and 4. As here shown, the ring comprises an annular outer casing 17 of asbestos fiber preferably treated with graphite, mica, or talc, which materials act as a dry lubricant for the packing, and an inner container or casing 18 completely enclosing the shot 12 and holding the same isolated from the surrounding walls of the asbestos casing.

The outer asbestos casing may have any of the several forms illustrated in Figures 2, 5, 6 and 7. In Figures 2 and 4, for instance, the asbestos casing may comprise annular complementary channel-shaped inner and outer sections 20 and 21, respectively, telescoped together with the flanges 22 of the outer section embracing the flanges 23 of the inner section, and with the webs of the channel-shaped sections defining the top and bottom or end walls 24 of the ring.

In Figures 5 and 6 similar constructions are shown for the outer asbestos casing, the only difference being that the flanges are stepped as at 26 to provide interengaging shoulders parallel to but intermediate the top and bottom walls of the ring.

In Figure 7 the outer asbestos casing is shown constructed in the more or less conventional manner disclosed in Patent No. 1,526,628.

While the construction of the outer asbestos casing may be varied, it is of the essence that the shot 12 confined within the packing ring be entirely contained within the annular inner casing 18, and that this inner casing have spaced inner and outer side walls 28 which provide a lining for the side walls of the cavity in the outer casing, and top and bottom walls 30 and 31, respectively, which act as protective linings for the top and bottom walls of the asbestos casing.

One form of inner shot container which has been found highly acceptable for the purposes of this invention is shown in Figures 1, 2, 3, and 4. As here shown, the container is of annular hollow construction and has a body 33 channel-shaped in cross section. The upright flanges of the channel-shaped body provide the spaced concentric side walls 28 of the container and its web provides the bottom wall 31; while the top wall 30 of the container is provided by a ring-like cover which overlies the upper edges of the body side walls and has downwardly extending flanges 34 embracing the upper edge portions of the body side walls.

In this embodiment of the invention, the side walls 28 are offset inwardly at those portions thereof which are overlapped by the cover flanges, a distance substantially corresponding to the thickness of the cover flanges so that the exterior surfaces of the latter will lie flush with the exterior surfaces of the non-offset portions of the body side walls.

In order to safeguard against the possibility of loss of shot from the core element during handling thereof, the cover is preferably joined to the body of the container in any suitable manner, such as by cooperating detent elements on the cover and the body; or by soldering the entire joint between the cover and body at the exterior of the container as shown at 35. Obviously, spaced solder joints may be used for this purpose if desired, or friction alone may be relied upon if the cover flanges are spaced to tightly engage the body side walls.

The shot container shown in cross section in Figure 16 is similar, in most respects, to that of Figures 2 and 4 except that it is constructed from complementary inner and outer channel-shaped sections 37 and 38, respectively, telescoped together with the flanges of the upper section overlapping the flanges of the lower section. In this instance each of the sections has side walls of less height than the vertical dimension in the shot cavity of the asbestos casing.

In the core element shown in Figure 5, the shot container has a body portion similar to that of Figures 2 and 4 but with inwardly directed flanges 40 at the upper edges of the body side walls providing a flat ledge for the reception of an entirely flat ring-shaped cover 41. It is to be understood, of course, that the cover 41 may be soldered or otherwise secured in place in the manner described previously.

In all forms of the invention, however, the core element comprising the container and the shot completely enclosed therein is adapted to be made as a unit which can be subjected to considerable handling prior to installation in the shot cavity of the outer asbestos casing of the packing ring without danger of loss of shot. In all embodiments also the completely closed container for the shot affords protection for all of the walls of the cavity in the asbestos casing, preventing damage thereto by the shot.

Since the walls of the container in each instance are made of a readily deformable metal such as sheet copper or some other material having high ductility and noncorrosive characteristics, the container will be sufficiently flexible to allow the desirable translation of endwise compressive forces on the packing ring into side thrust for expansion of the ring into good contact with the walls of the stuffing box and valve stem to thereby guard against leakage along these surfaces. In fact the provision of metal liners for the top and bottom walls as well as side walls of the cavity in the asbestos cover makes possible a far better general distribution of side loading or radial thrust than was possible in the past.

Another important advantage of the packing ring of this invention is that its core element allows removal of the packing from a valve entirely without the loss of shot. This was impossible in the past since the removal of the asbestos cover, in pieces, always exposed the shot and most of it was lost.

If desired, any of the packing rings of this invention may be made in longitudinally split sections as suggested in the Church Patent No. 1,526,628. When so constructed the packing ring will comprise complementary semi-circular ring sections capable of being applied to a valve stem or the like from opposite sides of the stem without removal of the headgear of a valve already in place. In this case also the shot in each of the semicircular sections would be entirely enclosed within a metal inner casing which isolates the shot from and prevents it from contacting the walls of the surrounding asbestos casing.

From the foregoing description taken together with the accompanying drawings it will be readily appreciated by those skilled in the art that this invention provides a high pressure packing ring of greatly improved construction, by reason of the fact that the shot embedded therein is wholly contained within a metal inner casing which isolates the shot from and prevents it from coming into contact with the walls of the surrounding asbestos casing.

What I claim as my invention is:

A high pressure packing ring comprising: an outer annular casing of fibrous heat resisting material, said casing consisting of two complementary rings each U-shaped in cross section and having cylindrical inner and outer side walls, said rings being disposed with their open sides facing each other, the cylindrical side walls of the two rings having their adjacent edge portions complementarily reduced in thickness and telescoped one within the other, so that the two rings together define a closed hollow annulus, the cylindrical side walls of which are of substantially uniform thickness throughout, including the portions thereof formed by the telescoped edge portions of the rings; and a core element inside said hollow annulus, said core element consisting of a pair of complementary rings formed of ductile sheet metal and each U-shaped in cross section and having cylindrical side walls, the rings being opposed and telescoped one within the other to define a completely closed annular chamber, and shot confined within said chamber and filling the same.

JAMES M. STOREY.

References Cited in the file of this patent

UNITED STATES PATENTS

| Number | Name | Date |
|---|---|---|
| Re. 13,006 | Huhn | Aug. 10, 1909 |

FOREIGN PATENTS

| Number | Country | Date |
|---|---|---|
| 15,452 | Great Britain | Nov. 24, 1884 |
| 204,804 | Great Britain | Oct. 11, 1923 |